United States Patent Office 3,401,156
Patented Sept. 10, 1968

3,401,156
ALKYLENEAMINE POLYMERS CONTAINING NITROFORMATE GROUPS
John R. Lovett, Edison, and Anthony J. Passannante, Metuchen, N.J., assignors to Esso Research and Engineering Company, a corporation of Delaware
No Drawing. Filed Feb. 17, 1961, Ser. No. 90,144
9 Claims. (Cl. 260—89.7)

This invention relates to a high nitro content compound made by reacting a polymer of an olefinic amine or imine with nitroform, $HC(NO_2)_3$.

The polymeric reactants containing amino groups which can be used are represented by the following:

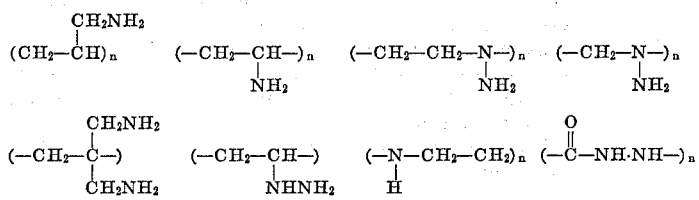

For the sake of brevity these compounds are named as polyalkenyl-amines, since the monomeric hydrocarbon group is typified by the ethenyl group ($-CH_2-CH_2-$) and the amine substituent function. The term amine or amino is used generically to include the imine substituent function (:NH) and hydrazino function ($-NH \cdot NH-$), and the like. The subscript $n$ indicates that a number of the recurring units are linked together.

The polyalkenylamine nitroformates are interesting and useful compounds. They are easily prepared salts of nitroform. These salts may be made to contain a high ratio of nitro groups to carbon atoms thus making them potent oxygen sources. These salts have reasonable thermal stability. Studies have shown that stabilizers can make these salts of practical value as rocket propellant binders.

Although the polyalkenylamine nitroformates when formed are as a class amorphous powders when dry, they are easily plasticized to rubbery materials having suitable tensile strength and elasticity. Their high $NO_2/C$ ratio permits their use in high proportions, e.g. up to 30 vol. percent in propellant systems that are required to meet high specific impulse requirements, e.g. Isp. values in the range of about 280 to 300.

Typical new polyalkenylamine products which have been prepared are (I) polyvinylamine nitroformate, (II) polyethylene-imine nitroformate and (III) polyethylenehydrazine nitroformate.

Example I

Polyvinylamine was prepared as a hydrobromide salt according to the directions of Reynolds & Kenyon (JACS, 69, 911 (1947)). The hydrobromide was converted to the nitroformate by the reaction of nitroform and an aqueous solution of the hydrobromide from which the product separated. The aqueous supernatant liquid was decanted off and the solid residue was taken up in acetone and precipitated by the addition of chloroform. A bright yellow solid product having a melting point of 135° C. was obtained. The structure for the polyvinylamine nitroformate salts is the following:

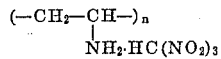

Example II

Polyethyleneimine,

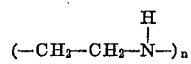

is commercially available and offers an attractive route to polymers containing a high proportion of $NO_2$ groups. Reaction of polyethyleneimine with nitroform was carried out by mixing a stoichiometrical proportion of nitroform to react with the amine groups at a reaction temperature of 25° C. using water as diluent. The nitroformate salt formed was recovered by decanting the supernatant liquid and vacuum drying the residue. The nitroformate product was a solid which analyzed reasonably well for the desired product:

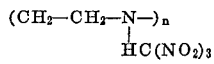

N calc. 28.8%. Found 27.5%.

The yellow polyethyleneimine nitroformate was also analyzed by an ultraviolet spectroscopic method which indicated it to have the requisite amount of nitroformate ion.

Example III

Polyethylenehydrazine nitroformate was prepared by reaction of polyethylene hydrazine with nitroform in either water or methanol. The nitroformate salt of the polymer was obtained as a yellow solid which on warming and standing turned to an oil. The salt analyzed as the following product:

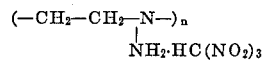

N calc. 33.49%. Found 32.85%.

Stability tests run on the polymeric salts showed a relative stability of I>II>III. Other stability studies indicated that the polyalkenylamine nitroformate salts of increased stability are the salts of polymers having an amino group attached to a primary carbon. An example of a polyalkenylamine nitroformate of high stability may be polyallylamine nitroformate. Other polymer nitroformate structures of high stability are represented by the following structures:

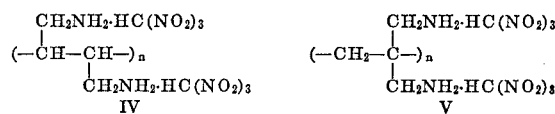

The polyalkenylamine nitroformates obtained are characterized as polymers having a backbone chain of carbon atoms or of both carbon and nitrogen atoms, each recurring monomeric unit containing from 1 to 4 C atoms and 1 to 4 amino N atoms to which are attached 1 to 4 $HC(NO_2)_3$ moieties. Typical compositional formulae for the reacted monomeric units and polymeric compounds correspond to the following:

$$C_2H_5N_5O_6$$
$$C_3H_7N_5O_6$$
$$C_3H_5N_4O_6$$
$$C_3H_6N_4O_6$$

The most common and average composition is approximately:

$$C_3H_6N_4O_6$$

The polyalkenylamine nitroformates, preferably plasticized, are useful as binders to impart strength and rigidity to composites of fuels and oxidizers. Powdered metals, e.g. boron, aluminum, magnesium, beryllium, and lithium may be used as fuels. Compounds containing nitro groups, e.g. hexnitroethane, ammonium perchlorate, nitronium perchlorate may be added as oxygen oxidizers. Difluoramino compounds, e.g. tetrakis $(NF_2)$ butane, tetrakis to hexakis $(NF_2)$ furan may be used as $CNF_2$ oxidizers.

Typical rocket propellant formulations contain 20 to 30% of $CNF_2$ oxidizer, 30 to 40% of oxygen oxidizer, 2 to 10% powdered metal, and 20 to 40% of the high energy binder to obtain solid propellant composites having specific impulse values in the range of 270 to 300.

Fortunately the liquid $CNF_2$ oxidizers are compatible with the polyalkyleneamine nitroformates and act as plasticizers thereof.

Various stabilizers may be admixed in small amounts.

What is claimed is:

1. Polyalkyleneamine nitroformate.
2. Polyalkyleneamine nitroformate characterized by polymers containing in each recurring monomeric unit 1 to 4 C atoms, 1 to 4 N atoms with attached 1 to 4 $HC(NO_2)_3$ moieties.
3. Polyvinylamine nitroformate having the recurring unit:

$$(-CH_2-CH-)$$
$$\phantom{(-CH_2-}|$$
$$\phantom{(-CH_2-}NH_2 \cdot HC(NO_2)_3$$

4. Polyethyleneimine nitroformate having the recurring unit:

$$(-CH_2-CH_2-N-)$$
$$\phantom{(-CH_2-CH_2-}|$$
$$\phantom{(-CH_2-CH_2-}HC(NO_2)_3$$

5. Polyethylenehydrazine nitroformate having the recurring unit:

$$(-CH_2-CH_2-N-)$$
$$\phantom{(-CH_2-CH_2-}|$$
$$\phantom{(-CH_2-CH_2-}NH_2 \cdot HC(NO_2)_3$$

6. Polybutyleneamine nitroformate having the recurring unit:

$$\phantom{(-CH_2-}CH_2NH_2 \cdot HC(NO_2)_3$$
$$\phantom{(-CH_2-C}|$$
$$(-CH_2-C-)_n$$
$$\phantom{(-CH_2-C}|$$
$$\phantom{(-CH_2-}CH_2NH_2 \cdot HC(NO_2)_3$$

wherein the subscript $n$ indicates a number of said units linked together.

7. Polypropyleneamine nitroformate having the recurring unit:

$$\phantom{(-CH_2-}CH_2NH_2 \cdot HC(NO_2)_3$$
$$\phantom{(-CH_2-C}|$$
$$(-CH_2-CH-)_n$$

wherein the subscript $n$ indicates a number of said units linked together.

8. The method of preparing a high-energy polymer which comprises reacting a polyalkenylamine containing 1 to 4 C atoms and 1 to 4 N atoms in its recurring unit with $HC(NO_2)_3$.

9. The method of claim 8 in which the polyalkenylamine is reacted with $HC(NO_2)_3$ in aqueous liquid to form a solid precipitate of nitroformate salt of the polyalkenylamine.

References Cited

UNITED STATES PATENTS 3,346,546 10/1967 Beach et al. _____ 260—94.7
3,351,663 11/1967 Guthrie _____ 260—583

JOSEPH L. SCHOFER, *Primary Examiner.*

W. F. HAMROCK, *Assistant Examiner.*